United States Patent
Yu et al.

(10) Patent No.: US 9,546,879 B2
(45) Date of Patent: Jan. 17, 2017

(54) USER TERMINAL, METHOD FOR PROVIDING POSITION AND METHOD FOR GUIDING ROUTE THEREOF

(75) Inventors: Seung-dong Yu, Gyeonggi-do (KR); Woo-Yong Chang, Gyeonggi-do (KR); Se-jun Park, Gyeonggi-do (KR); Min-jeong Moon, Gyeonggi-do (KR); Soo-hong Park, Gyeonggi-do (KR); Jin-guk Jeong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 973 days.

(21) Appl. No.: 12/938,873

(22) Filed: Nov. 3, 2010

(65) Prior Publication Data

US 2011/0159858 A1 Jun. 30, 2011

(30) Foreign Application Priority Data

Nov. 3, 2009 (KR) ........................ 10-2009-0105457

(51) Int. Cl.
*H04M 1/00* (2006.01)
*G01C 21/34* (2006.01)
(Continued)

(52) U.S. Cl.
CPC ....... *G01C 21/3438* (2013.01); *G01C 21/3623* (2013.01); *G01C 21/3679* (2013.01); *G06K 9/00664* (2013.01)

(58) Field of Classification Search
CPC .......... H04W 4/04; H04W 4/027; H04W 4/02; H04W 64/00; H04W 4/021; H04W 4/023; H04W 4/025; H04W 64/003; H04W 68/12; H04M 2250/10; H04M 2250/12; H04M 2250/52; H04M 2250/74; H04M 1/72572; H04L 67/18; H04L 67/24; H04L 67/02; G01C 21/20; G01C 21/343; G01C 21/3605; G01C 21/3644
(Continued)

(56) References Cited

U.S. PATENT DOCUMENTS 5,583,776 A   12/1996   Levi et al.
6,618,683 B1   9/2003   Berstis et al.
(Continued)

FOREIGN PATENT DOCUMENTS

CN   101484346   7/2009
CN   101552962   10/2009
(Continued)

OTHER PUBLICATIONS

Harlan Hile et al., "Landmark-Based Pedestrian Navigation from Collections of Geotagged Photos", 7th International Conference, Dec. 3-5, 2008.
(Continued)

*Primary Examiner* — Nimesh Patel
(74) *Attorney, Agent, or Firm* — The Farrell Law Firm, P.C.

(57) ABSTRACT

A user terminal generates position information regarding a position of the user terminal, generates target recognition information for recognizing a target, communicates with a counterpart terminal, and determines whether the target recognition information conforms with first reference information. If so, the user terminal transmits the target recognition information and the position information to the counterpart terminal, and if the information does not conform, the terminal determines whether the target recognition information conforms with second reference information. Accordingly, the user terminal easily provides route guidance to a destination.

12 Claims, 15 Drawing Sheets

(51) Int. Cl.
*G01C 21/36* (2006.01)
*G06K 9/00* (2006.01)

(58) Field of Classification Search
USPC .............. 455/550.1, 414.1, 456.1, 410, 566
See application file for complete search history.

(56) References Cited

U.S. PATENT DOCUMENTS

| | | | |
|---|---|---|---|
| 2003/0088359 A1* | 5/2003 | Park et al. | 701/200 |
| 2005/0286493 A1 | 12/2005 | Angelhag | |
| 2006/0244830 A1 | 11/2006 | Davenport et al. | |
| 2006/0248224 A1 | 11/2006 | Belhoula et al. | |
| 2007/0036469 A1* | 2/2007 | Kim et al. | 382/305 |
| 2007/0244634 A1 | 10/2007 | Koch et al. | |
| 2008/0039120 A1* | 2/2008 | Gad | 455/456.2 |
| 2008/0268876 A1 | 10/2008 | Gelfand et al. | |
| 2009/0312871 A1* | 12/2009 | Lee et al. | 700/259 |
| 2009/0319172 A1* | 12/2009 | Almeida et al. | 701/201 |
| 2011/0015858 A1 | 1/2011 | Takagi et al. | |

FOREIGN PATENT DOCUMENTS

| | | |
|---|---|---|
| EP | 1582844 | 10/2005 |
| EP | 1 703 445 | 9/2006 |
| EP | 2 101 153 | 9/2009 |
| JP | 06-120875 | 4/1994 |
| JP | 2000-081339 | 3/2000 |
| JP | 2003-287433 | 10/2003 |
| JP | 2005-100276 | 4/2005 |
| JP | 2007-298404 | 11/2007 |
| JP | 2008-032744 | 2/2008 |
| JP | 4231507 | 12/2008 |
| JP | 2009-210345 | 9/2009 |
| KR | 1020060056580 | 5/2006 |
| RU | 2 282 952 | 8/2006 |
| WO | WO 2004/077374 | 9/2004 |
| WO | WO 2005/061993 | 7/2005 |
| WO | WO 2006/137667 | 12/2006 |
| WO | WO 2007/100299 | 9/2007 |
| WO | WO 2008/044309 | 4/2008 |
| WO | WO 2009/116331 | 9/2009 |

OTHER PUBLICATIONS

Russian Office Action dated Nov. 25, 2014 issued in counterpart application No. 2012122698/07.
Summons to Oral Proceedings dated Feb. 5, 2015 issued in counterpart application No. 10189729.6-1557.
Australian Examination Report dated Dec. 17, 2014 issued in a counterpart application No. 2010316119.
Chinese Office Action dated Jan. 12, 2015 issued in counterpart application No. 201010529934.6.
Australian Examination Report dated Sep. 5, 2014 issued in a counterpart application No. 2010316119.
Japanese Office Action dated Sep. 16, 2014 issued in a counterpart application No. 2010-247374.
Australian Examination Report dated Mar. 5, 2015 issued in a counterpart application No. 2010316119.
Australian Examination Report dated Apr. 8, 2015 issued in a counterpart application No. 2010316119.
Australian Examination Report dated May 25, 2015 issued in a counterpart application No. 2010316119.
Chinese Office Action dated Aug. 24, 2015 issued in a counterpart application No. 201010529934.6, 15 pages.
Australian Examination Report dated Sep. 24, 2015 issued in a counterpart application No. 2010316119, 3 pages.
Japanese Office Action dated Jun. 1, 2015 issued in a counterpart application No. 2010-247374, 7 pages.
Australian Examination Report dated Jul. 6, 2015 issued in a counterpart application No. 2010316119, 3 pages.
Korean Office Action dated Feb. 18, 2016 issued in a counterpart application No. 10-2009-0105457, 11 pages.
Japanese Office Action dated Feb. 8, 2016 issued in a counterpart application No. 2010-247374, 4 pages.

* cited by examiner

Candidate Lists

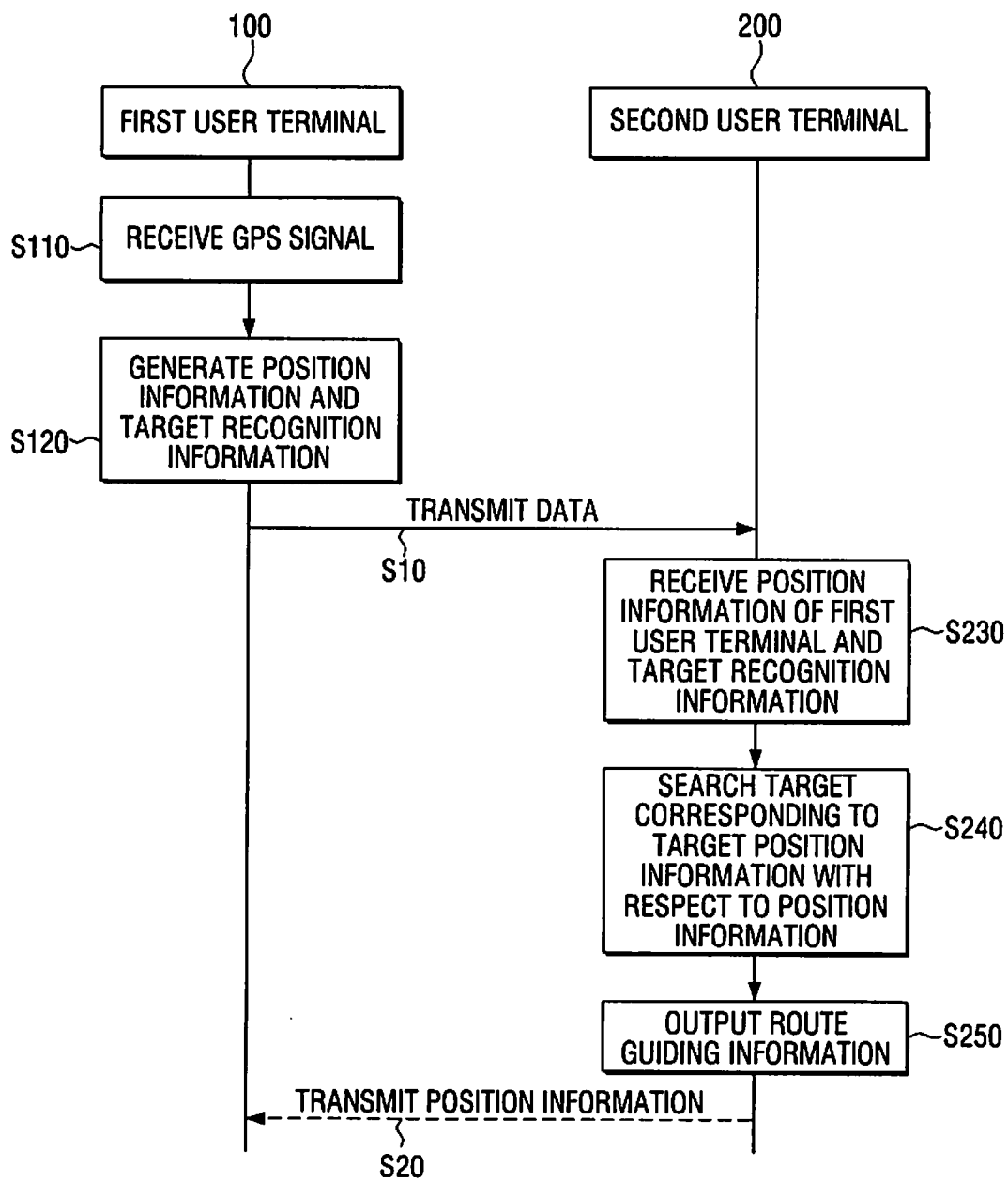

USER TERMINAL, METHOD FOR PROVIDING POSITION AND METHOD FOR GUIDING ROUTE THEREOF

PRIORITY

This application claims priority under 35 U.S.C. §119(a) to Korean Patent Application No. 2009-0105457, filed in the Korean Intellectual Property Office on Nov. 3, 2009, the contents of which are incorporated herein by reference.

BACKGROUND OF THE INVENTION

1. Field of the Invention

The present invention relates generally to a user terminal and a method for providing a position and a route thereof, and more particularly, to a method for providing position and a guiding a route thereof using a user terminal which guides a route using target recognition and position information.

2. Description of the Related Art

There has been a recent growth in Location Based Service (LBS) technology that is connected with Global Positioning System (GPS) and Geographical Information System (GIS) technologies. Accordingly, a user may at any time utilize information regarding the position of a route, an object, and the surroundings. In particular, LBS technology allows a user to enjoy not only mobile communication but also various types of information such as route information, using a mobile communication terminal.

However, conventional route information such as from a departing place to a destination, based on location information such as from a GPS, is typically for a driver. That is, conventional mobile communication systems are not designed to provide route information for a pedestrian or a user of public transportation.

In addition, if a text message that a user receives from a caller terminal includes information regarding a place for an appointment, the user has to inconveniently connect to the Internet to search route information from the current location to the destination. Furthermore, if a user is in a location where Internet access is not available, the user may not be provided with route information.

SUMMARY OF THE INVENTION

Aspects of embodiments of the present invention relate to a user terminal that provides route guidance using target recognition information and position information, a method for providing position, and a method for guiding a route thereof.

According to the present invention, a user terminal includes a position information generating unit which generates position information regarding a position of the user terminal, a recognition information generating unit which generates target recognition information for recognizing a target, a communication unit which communicates with a counterpart terminal, and a controller which controls the communication unit to receive GPS information whether the target recognition information conforms with first reference information, and if verification is successful, to transmit the target recognition information and the position information to the counterpart terminal, and if verification fails, to receive GPS information whether the target recognition information conforms with second reference information.

The user terminal may further include an input unit which receives a message, and the recognition information generating unit may generate a text message including a trade name of the target input through the input unit as the target recognition information.

The user terminal further includes a sensing unit that detects direction information, and the controller control the communication unit to transmit direction information detected by the sensing unit to the counterpart terminal along with the target recognition information and the position information.

A user terminal, according to the present invention, includes a communication unit which receives position information of the counterpart terminal and target recognition information generated by the counterpart terminal from the counterpart terminal, a search unit which searches target information corresponding to the target recognition information with respect to the position information, an output unit which outputs route guiding information, and a controller which controls the output unit to output route guiding information for guiding a route to the searched target information, and the target recognition information which is determined as conforming with at least one of first reference information and second reference information pre-set by the counterpart terminal.

The user terminal further includes a position information generating unit which generates position information regarding a position of the user terminal, and the communication unit transmits the generated position information to the counterpart terminal according to a user's command.

The user terminal further includes a target candidate list generating unit which generates a target candidate list using target direction information and position information of the counterpart terminal received from the counterpart terminal, and the search unit searches a target corresponding to the target recognition information in the target candidate list.

A method for providing position of a user terminal, according to the present invention, includes generating position information regarding a position of the user terminal, generating target recognition information for recognizing a target, determining whether the target recognition information conforms with first reference information, and if determination is successful, transmitting the target recognition information and the position information to the counterpart terminal, and if the determination fails, determining whether the target recognition information conforms with second reference information.

The method further includes detecting direction information of the user terminal and transmitting the detected direction information to the counterpart terminal along with the target recognition information and the position information.

A method for guiding a route of a user terminal, according to the present invention, includes receiving position information of the counterpart terminal and target recognition information generated by the counterpart terminal from the counterpart terminal, searching target information corresponding to the target recognition information with respect to the position information, and outputting route guiding information for guiding a route to the searched target information, and the target recognition information may be information which is determined to conform with at least one of first reference information and second reference information pre-set by the counterpart terminal.

The method further includes generating a target candidate list using target direction information and position information of the counterpart terminal received from the counterpart terminal, and the searching includes searching a target corresponding to the target recognition information in the target candidate list.

Accordingly, a moving path to a destination is provided with ease.

BRIEF DESCRIPTION OF THE DRAWINGS

The above and/or other aspects of the present invention will be more apparent by describing embodiments with reference to the accompanying drawings, in which:

FIG. 11 illustrates a route guiding method of a route guiding system according to an embodiment of the present invention.

DETAILED DESCRIPTION OF EMBODIMENTS OF THE INVENTION

Figure 1:
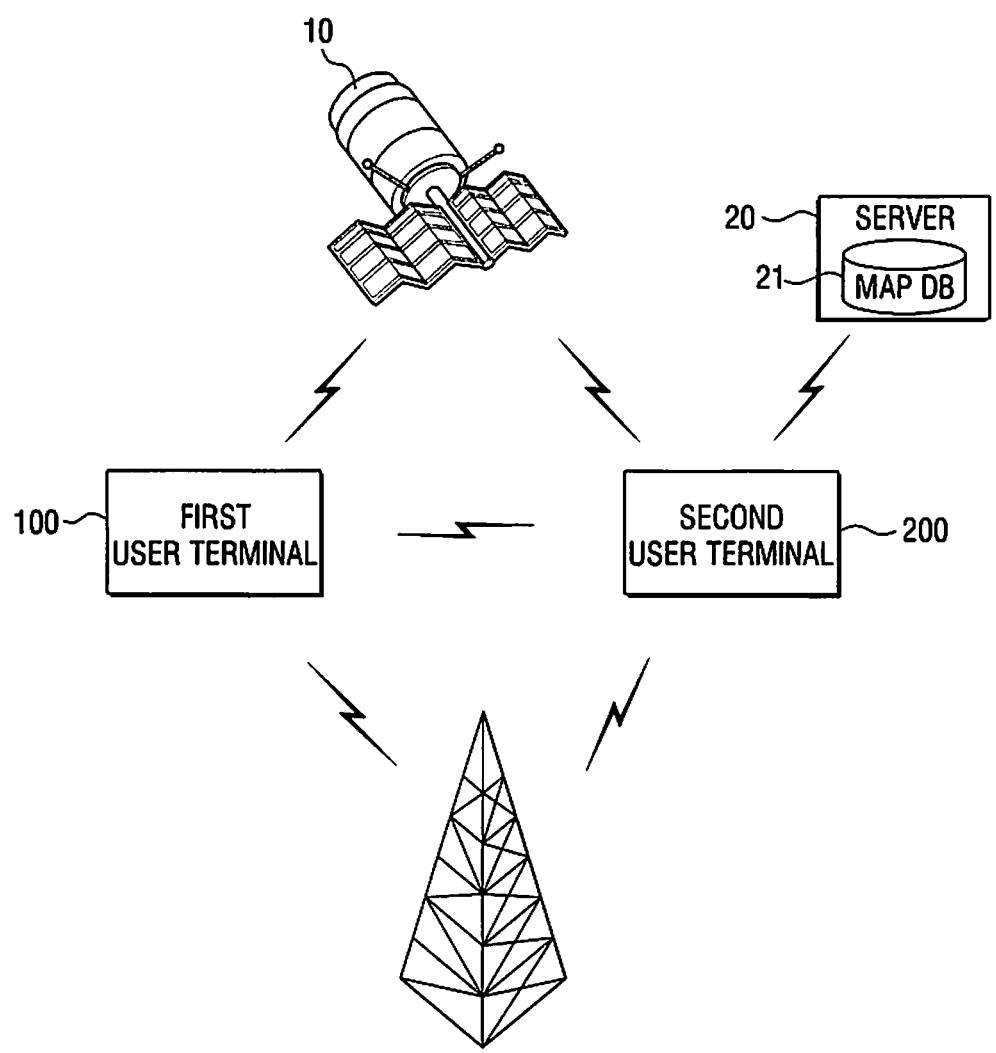
FIG. 1 illustrates a mobile communication system according to an embodiment of the present invention.

Embodiments of the present invention will now be described in greater detail with reference to the accompanying drawings. In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail for the sake of clarity and conciseness.

FIG. 1 illustrates a mobile communication system according to an embodiment of the present invention. Referring to FIG. 1, the mobile communication system includes a first mobile user terminal 100, a second mobile user terminal 200, a GPS satellite 10, a server 20, and a base station 30.

The first and second user terminals 100, 200 may freely communicate with each other while on the move in a service area of the base station 30, and may be various types of portable apparatuses such as a cellular phone, a Personal Communication Service (PCS) phone, and a navigator. In some cases, the terminals 100, 200 may be embodied as a mobile communication terminal such as a Personal Digital Assistant (PDA), a hand-held Personal Computer (PC), a Global System for Mobile (GSM) phone, a Wideband Code Division Multiple Access (W-CDMA) phone, a CDMA-2000 phone, and a Mobile Broadband System (MBS) phone.

In addition, the user terminals 100, 200 may identify a current position by receiving a GPS signal transmitted from the GPS satellite 20.

Specifically, the user terminals 100, 200 may calculate their current position by measuring signal arrival time and distance from more than three GPS satellites.

In addition, a Differential GPS (DGPS) may be used to minimize a margin of error.

The user terminals 100, 200 receive not only the latitude, longitude, and altitude position parameters, but also information regarding a three-dimensional speed and an accurate time.

In addition, the user terminals 100, 200 perform wireless communication with the server 20, which has map database 21 (hereinafter map DB) that stores map data. The user terminals 100, 200 may load map data corresponding to the current position of the mobile user terminal 100 from the map DB 21 by communicating with the server 20, and provide a route guiding function by continuously communicating with the GPS satellite 10 and the server 20.

Figure 2A:
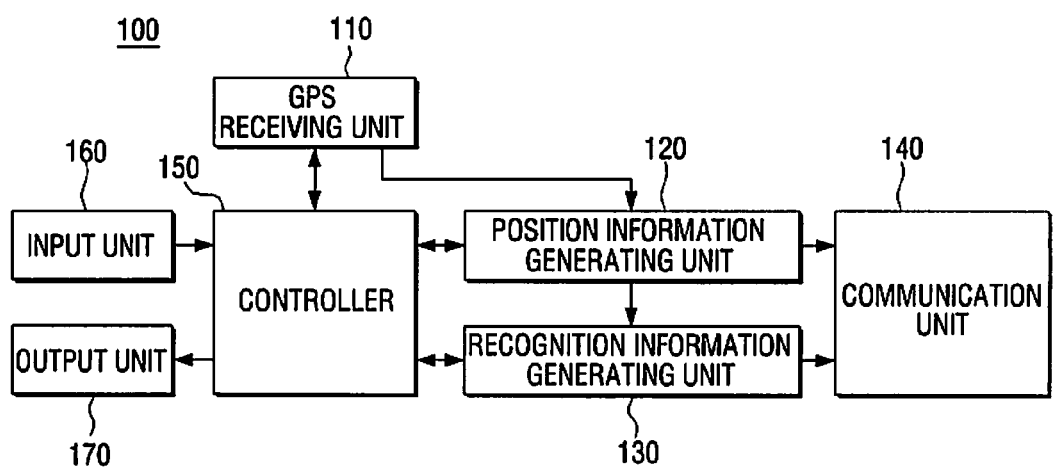
FIGS. 2A and 2B illustrate a user terminal 100 according to a first embodiment of the present invention.
Figure 2B:
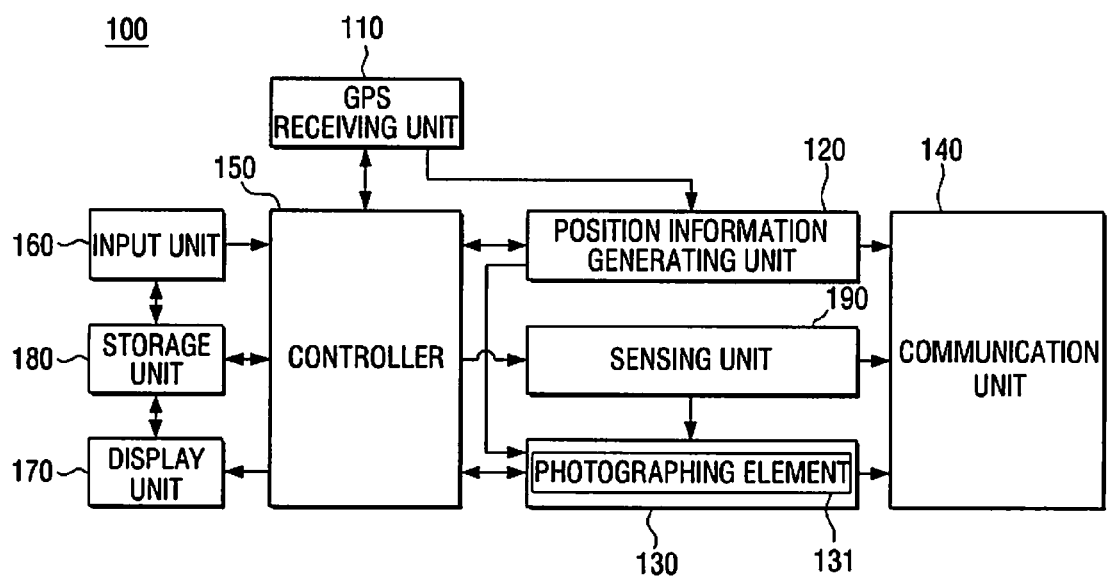

FIGS. 2A and 2B illustrate the user terminal 100 according to an embodiment of the present invention.

Referring to FIG. 2, the user terminal 100 includes a GPS receiving unit 110, a position information generating unit 120, a recognition information generating unit 130, a communication unit 140, a controller 150, an input unit 160, and a display (output) unit 170.

The GPS receiving unit 110 receives a GPS signal from a GPS satellite (FIG. 1, 10).

The position information generating unit 120 generates position information which indicates the current position of the user terminal 100.

Specifically, the position information generating unit 120 may generate position information including latitude, longitude, and altitude of a current position using a GPS signal received through the GPS receiving unit 110.

The recognition information generating unit 130 generates target recognition information for recognizing a target. Herein, the target recognition information includes a text for identifying a target, and also includes a trade name, building name, street name, address, and telephone number.

The target recognition information may be a text extracted from image data or a text included in a text message, which will be explained below in greater detail.

The communication unit 140 communicates with a counterpart terminal, which includes any apparatus which may execute an application to which the technical feature of the present invention is applicable. For example, the communication unit 140 may be embodied as a mobile communication terminal such as a cellular phone and a Personal Communication Service (PCS) phone. In some cases, the communication unit 140 may be embodied as a mobile communication terminal such as a PDA, a hand-held PC, a GSM phone, a W-CDMA phone, a CDMA-2000 phone, and a Mobile Broadband System (MBS) phone.

In addition, the communication unit 140 may transmit/receive data to and from a map DB or a route providing server, and may perform data communication with an external data server (not shown) which stores at least one of first reference information (reference information) and second reference information (additional reference information), which will be explained below in detail.

Herein, the communication unit 140 may further include a modem, an antenna, and a signal amplifier that may perform modulation/demodulation of a signal.

The controller 150 controls every component of the user terminal 100, and may include a Digital Signal Processer (DSP), a microprocessor, and other circuits. In particular, the controller 150 may include an application that performs the function of the present invention.

The controller 150 executes a corresponding application to generate consolidated data by combining position information generated by the position information generating unit 120 with target recognition information generated by the target information generating unit 130. For example, the controller 150 may tag position information generated by the position information generating unit 120 to target recognition information generated by the target information generating unit 130 and vice versa.

In this case, the controller 150 may receive GPS information and tag position information to target recognition information when the target recognition information is generated or transmitted.

For example, if target recognition information is image data photographed by a camera, a GPS signal may be concurrently received when the image data is photographed.

In addition, the controller 150 may determine whether target recognition information conforms with first reference information, and if it is determined that the target recognition information conforms with the first reference information, the controller 150 may control to transmit the target recognition information and position information to a counterpart terminal.

Alternatively, if the determination fails, the controller 150 may determine whether the target recognition information conforms with second reference information, and if it is determined that the target recognition information conforms with the second reference information, the controller 150 may control to transmit the target recognition information and position information to a counterpart terminal.

In this case, the first reference information may include at least one of a trade name and a building name, and the second reference information may include at least one of an address and a telephone number.

The first and the second reference information may be provided from at least one of a storage unit and an external database server in the user terminal 100.

If the first and the second reference information is stored in a storage unit formed in the user terminal 100, the first and the second reference information may be stored in a storage unit (not shown) as an application is executed. The same application may be executed in a counterpart terminal and thus, the same first and second reference information may be stored both in the user terminal 100 and the counterpart terminal.

The input unit 160 may generate various signals corresponding to user manipulation and transmit the generated signals to the controller 150. In particular, if a user manipulates the input unit 160 to generate target recognition information, the input unit 160 may generate a signal corresponding to the user manipulation and transmit the generated signal to the controller 150.

If a user manipulates the input unit 160 to transmit target recognition information to which position information is tagged to a counterpart terminal, the input unit 160 may generate a signal corresponding to the user manipulation and transmit the generated signal to the controller 150.

The input unit 160 may be embodied as an input means such as a keypad and/or a touch pad, and may have a plurality of number/text input keys, such as a function key for performing interface with a user, and a key for placing a telephone call.

The output unit 170 may include an image output unit (not shown) which allows data generated by the user terminal 100 to be displayed and recognized visually by a user and/or an audio output unit (not shown) which allows various data to be audibly recognized by a user.

Herein, the image output unit (not shown) may be a Liquid Crystal Display (LCD) or a Plasma Display Panel (PDP), and the audio output unit may be a speaker.

FIG. 2B illustrates a detailed configuration of the user terminal 100 in FIG. 2A. Detailed description regarding components that overlap with the components illustrated in FIG. 2A from among components illustrated in FIG. 2B will not be provided, for the sake of conciseness.

Referring to FIG. 2B, the user terminal 100 includes a GPS receiving unit 110, a position information generating unit 120, a photographing element 131, a communication unit 140, a controller 150, an input unit 160, a display unit 170, and a storage unit 180.

The recognition information generating unit 130 may include the photographing element 131 such as a digital camera, for photographing a target.

The photographing element 131 generates image data by photographing the trade name of a target under the control of the controller 150 according to a user's command input through the input unit 160. To do so, the photographing element 131 has a lens (not shown) which focuses an optical signal reflected from a subject, and a Charged Coupled Device (CCD) which converts the optic signal focused through the lens into an electrical signal.

The controller 150 may control to tag position information generated by the position information generating unit 120 to image data photographed by the photographing element 130.

That is, the controller 150 may control the GPS receiving unit 110 to receive a GPS signal when the photographing element 130 performs photographing.

When an image is photographed to provide route guidance to other terminals, the user terminal 100 may perform photographing using a menu, which is different from general photographing.

That is, a GPS signal may not be received when an image is photographed, but a GPS signal may be received when an image is photographed to provide route guidance.

The storage unit 180 may be a storing space which stores software such as an Operational System (OS) which is necessary to operate the user terminal 100.

In addition, the storage unit 180 may store at least one of the first reference information and the second reference information, which are downloaded by executing an application.

The storage unit 180 may store information regarding a counterpart terminal.

The communication unit 140 may transmit the photographing data (target recognition information) and position information to a counterpart terminal according to information regarding the counterpart terminal which is either input through the input unit 160 or stored in the storage unit 180.

A sensing unit 190 may be embodied as an azimuth sensor or a compass, and may measure a photographing direction when an image is photographed by the photographing element 130. Herein, a geomagnetic sensor may be used as a representative azimuth sensor.

If the sensing unit 190 is a geomagnetic sensor, the sensing unit 190 detects an azimuth angle corresponding to geomagnetism. The azimuth angle refers to an angle of the lens of the photographing element 131 (that is, a photographing direction), which rotates from north in a clockwise direction. In this case, north is a reference direction referred to as magnetic north. Accordingly, rotation in a clockwise direction with reference to magnetic north can be defined as positive (+) direction and rotating in a counter-clockwise direction with reference to magnetic north can be defined as negative (−) direction. Alternatively, the sensing unit 190 may further include a gradient sensor (not shown) and may calculate a gradient of the user terminal 100 during photographing.

The gradient sensor (not shown) measures a gradient in a vertical direction. The gradient can be defined as an angle which is formed between the user terminal 100 and ground, that is, a pitch angle. If it is assumed that the user terminal is placed on surface at a level with ground, a current gradient becomes 0°. In this case, if the user terminal 100 is rotated so that a lens direction of the user terminal 100, that is, a photographing direction, faces upwards, a gradient is changed. As for a gradient sign, an upwards direction can be defined as (+) and a downwards direction can be defined as (−).

As described above, the sensing unit 190 may generate a three-dimensional azimuth angle including a horizontal azimuth angle and a pitch angle, and provide the generated three-dimensional angle.

The controller 150 may control to tag direction information generated by the sensing unit 190 to image data photographed by the photographing element 130. Accordingly, even if there is an error in position information that is generated based on a GPS signal, the error can be corrected using direction information generated by the sensing unit 190. This will be explained in detail with reference to FIGS. 6A and 6B.

When target recognition information is a text message, a user generally drafts the text message while positioning the user terminal 100 to face a target, and thus, the direction of the user terminal 100 while drafting a text message may be measured and direction information may be generated accordingly.

Figure 3:
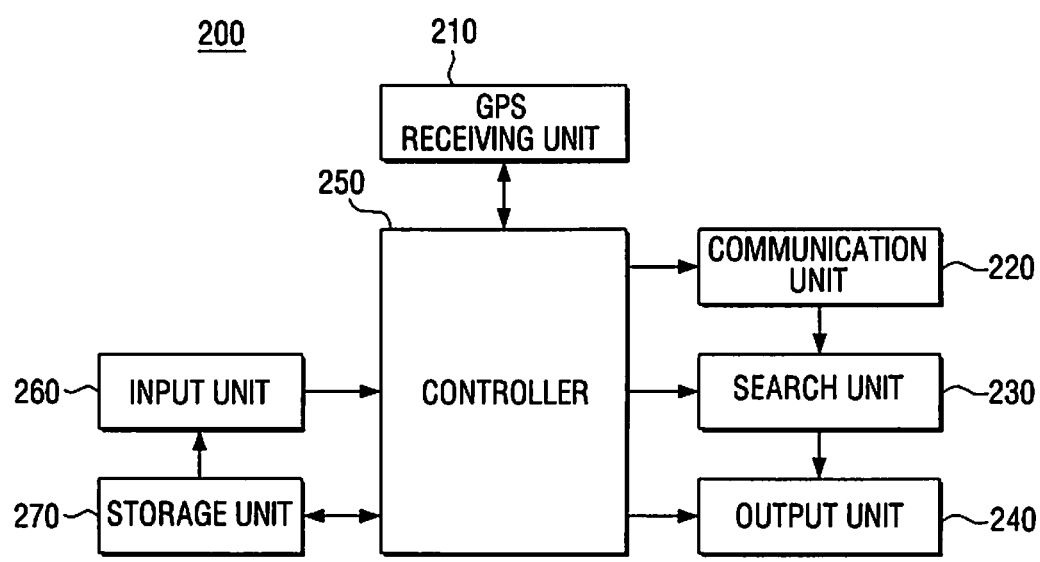
FIG. 3 illustrates a user terminal according to a second embodiment of the present invention.

FIG. 3 illustrates a user terminal according to a second embodiment of the present invention.

Referring to FIG. 3, a user terminal apparatus 200 includes a GPS receiving unit 210, a communication unit 220, a search unit 230, an output unit 240, a controller 250, an input unit 260, and a storage unit 270.

The GPS receiving unit 210 receives a GPS signal from a GPS satellite (FIG. 1, 10).

The position information generating unit (not shown) generates position information which indicates a current position of the user terminal 200.

Specifically, the position information generating unit (not shown) may generate position information including latitude, longitude, and altitude of a current position using a GPS signal received through the GPS receiving unit 210. The position information generating unit (not shown) receives a signal transmitted from a plurality of GPS satellites and calculates a distance between a satellite and a receiver using time difference between transmission time and reception time. By considering a calculated distance between each of a plurality of satellites and a position of the satellites comprehensively, a current position of the user terminal 200 may be calculated using an operation method such as trilateration.

The communication unit 220 receives position information of a counterpart terminal and target recognition information generated by the counterpart terminal. Herein, the counterpart terminal may be a user terminal illustrated in FIGS. 2A and 2B.

The position information may include information regarding latitude, longitude, and altitude of a current position of the counterpart terminal, which is calculated based on a GPS signal. The target recognition information may include a text for identifying a target and may be a text extracted from image data such as a trade name, building name, street name, and address, or a text included in a text message.

In addition, the communication unit 220 may transmit/receive data to and from map DB, a route providing server, or an external data server. The communication unit 220 may further include a modem, an antenna, and a signal amplifier that modulates/demodulates a signal.

The search unit 230 searches a target corresponding to target recognition information with reference to position information of a counterpart terminal which is received through the communication unit 220.

The search unit 230 determines whether there is information corresponding to target recognition information in at least one of the pre-stored first reference information and the second reference information.

Specifically, the search unit 230 determines whether there is information corresponding to target recognition information in the pre-stored first reference information first, and if there is no information corresponding to target recognition information in the pre-stored first reference information, the search unit 230 determines whether there is information corresponding to target recognition information in the second reference information.

Herein, at least one of the first and the second reference information may be provided by at least one of the storage unit in the user terminal 100 and an external database server (not shown).

If at least one of the first and the second reference information is stored in the storage unit 270 in the user terminal 200, the information may be stored in the storage unit 270 as an application is executed. The same application may be executed in a counterpart terminal 100 and thus, at least one of the same first and second reference information may be stored both in the user terminal 100 and the counterpart terminal 100. Accordingly, if the counterpart terminal receives target recognition information that is determined to correspond to at least one of the first and the second reference information, the user terminal 200 may also succeed in verifying the information.

In addition, if at least one of the first and the second reference information is stored in an external database server (not shown), the external database server (not shown) is used to access both the user terminal 200 and the counterpart terminal 100.

Herein, the first reference information includes at least one of a trade name and a building name, and the second reference information includes at least one of an address and a telephone number.

For example, if target recognition information is image data of a trade name, "TGI", a target corresponding to "TGI" may be searched with reference to position information (such as latitude, longitude, and altitude) of a counterpart terminal.

The output unit 240 may include an image output unit (not shown), which allows data generated by the user terminal 100 to be displayed and recognized visually by a user and/or an audio output unit (not shown), which allows various data to be audibly recognized by a user.

Herein, the image output unit (not shown) may be an LCD or a PDP, and the audio output unit may be a speaker.

In particular, the output unit 240 may output route guiding information from a current position to the searched target in the form of a navigation map.

The controller 250 controls every component of the user terminal 200, and may include a DSP, a microprocessor, and other circuits. In particular, the controller 250 may include an application that performs the function of the present invention.

In addition, the controller 250 may control the output unit 240 to output route guiding information for guiding a route searched by the search unit 230 by executing a corresponding application is executed.

Specifically, the controller 250 may control the output unit 240 to output route guiding information for guiding a route searched by the search unit 230 in the form of a navigation map.

The controller 250 may control to receive corresponding map information from map DB of the server (FIG. 1, 20) through the communication unit 220 and output a navigation map for guiding a route.

The navigation map may display such information as an optimum moving path to a target position, the shortest moving path, a time to reach the target position, a crossroads on the moving path, a junction, a major building, and a landmark.

If there are a plurality of moving paths to reach a target position, all the moving paths may be displayed for a user's selection.

The controller 250 may search a target by applying LBS technology to position information and target recognition information received through the communication unit 220, and outputting route guiding information by mapping the searched target to a navigation map.

If image data received through the communication unit 220 is received directly, a text for recognizing a target may be extracted from the image data through a text extracting unit (not shown) and used.

The image data may include direction information when a target is photographed. The direction information may be a three-dimensional azimuth angle including a horizontal azimuth angle and a pitch angle, as previously described.

A candidate list generating unit (not shown) may generate a candidate list within an error range by using position information (latitude, longitude, and altitude) tagged to image data and direction information (azimuth angle information). Direction information within an error range with reference to position information may be applied, or an error range for position information and direction information may be applied.

For example, if direction information indicates 60° of azimuth angle, a candidate list including target candidates within a radius of 30°-90° may be generated, but this is only an example. An azimuth angle or an error range for position information may differ depending on the situation. That is, if no target is detected within an error range, the error range may be increased to search target candidates.

If an accurate text is not extracted from image data (for example, due to light reflection or low image quality), or if there is an error in position information, a target candidate list may be generated based on direction information to search a target. This will be explained in detail with reference to FIGS. 6A and 6B.

If target recognition information is a text message including a trade name, the text message may be used as it is. Thus, a target may be searched for by generation of a target candidate list using direction information of the terminal 100 when the text message tagged to the text message is drafted.

If target recognition information includes both a text extracted from image data and a text included in a text message, both of the texts may be used or only one of them is selected and used.

In addition, target recognition information may be a plurality of texts extracted from a plurality of image data and/or a plurality of texts included in a plurality of text messages.

If a user's command is input through the input unit 260, the controller 250 controls the communication unit 220 to transmit position information generate through a position information generating unit (not shown) to a counterpart terminal.

The user terminal 200 may further include an electronic compass unit (not shown), which measures a moving direction of the user terminal 200 in real time.

The controller 250 may control the output unit 240 to display a current moving direction of the user terminal measured by the electronic compass unit (not shown) on a navigation map. Accordingly, a user may identify his or her moving path with reference to a moving path to a target.

If a user digresses from a path that conforms to route guiding information, a warning window or an alarm may be output to inform the user of the digression.

So that the user may easily find a destination, the controller 250 may provide photo information pre-stored in a server (FIG. 1, 20) for a crossroads, a junction, a landmark, or so forth so that the user has some assurance enroute to a destination.

If an image of crossroads, a junction, a landmark, or so forth which is confusing to a user is photographed, the user may display a moving path on the photographed image. This will be explained later with reference to a corresponding drawing.

The input unit 260 may generate various signals corresponding to user manipulation and transmit the generated signals to the controller 150. In particular, if a user wishes to transmit his or her position information to the counterpart terminal 100, the input unit 260 may receive a corresponding command and transmit the received command to the controller 250.

The input unit 260 may be an input means such as a keypad and/or a touch pad. The input unit 260 may have a plurality of keys such as number/text input keys, a function key for performing interface with a user, and a key for placing a telephone call.

The controller 250 may control the communication unit 220 to transmit position information generated through a position information generating unit (not shown) to the counterpart terminal 100.

In addition, the controller 250 may control to transmit target recognition information and position information generated at a current position of the user terminal 200 to the counterpart terminal 100 so that the position of the user terminal 200 is displayed on a moving path displayed on the current user terminal 200 and transmitted to the counterpart terminal 100. The user of the counterpart terminal 100 may receive a current position of the user terminal 200 in real time.

The storage unit 270 may be a storing space that stores software such as Operational System (OS) which is necessary to operate the user terminal 200.

In addition, the storage unit 270 may store information regarding a counterpart terminal.

Figure 4A:
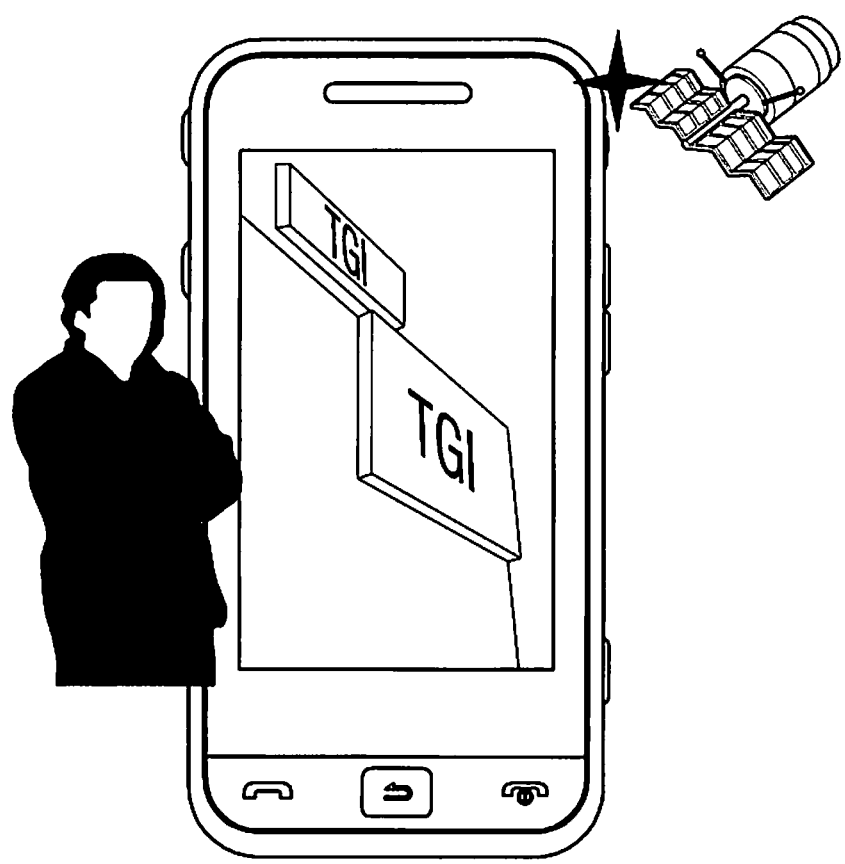
FIGS. 4A and 4B illustrate a position providing method of a user terminal according to FIGS. 2A and 2B.
Figure 4B:
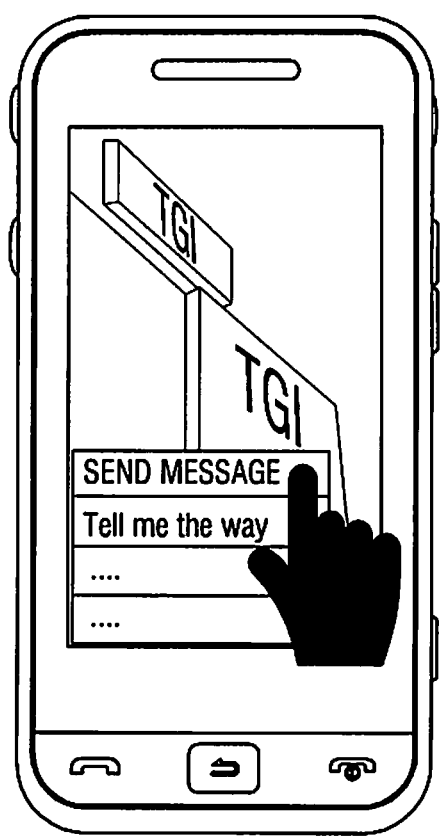

FIGS. 4A and 4B illustrate a position providing method of a user terminal according to FIGS. 2A and 2B.

Referring to FIG. 4A, a user A in possession of the user terminal 100 wishes to guide a user B (not shown) a route to "TGI".

The user A photographs the trade name of "TGI" using a camera formed in the user terminal 100 and generates target recognition information in the form of text "TGI" which is extracted from the photographed image data. In another embodiment, the user A may write a trade name of "TGI" in a text message using the user terminal 100 and generate target recognition information in the form of text "TGI". It is also possible to simultaneously generate both of the target recognition information simultaneously It is assumed that target recognition information is a text extracted from image data for convenience of explanation.

Herein, position information of the user terminal 100 at the time of photographing may be tagged to image data, and the position information is a signal generated using a GPS signal. Since the position information has already been explained above, further explanation will not be provided.

According to FIG. 4B, the user A may transmit data where target recognition information extracted from image data including the trade name of "TGI" photographed in FIG. 4A is tagged to the position information of the user terminal 100, to the user B.

Herein, the target recognition information in the form of a text extracted from image data may be information which conforms to at least one of the first and the second reference information pre-stored in a storage unit or an external data server as described above. Since this feature has been explained above in greater detail, further explanation will not be provided.

Alternatively, photographed image data may be transmitted as occasion demands.

FIGS. 5A to 5D illustrate a route guiding method of the user terminal according to FIG. 3.

Figure 5A:
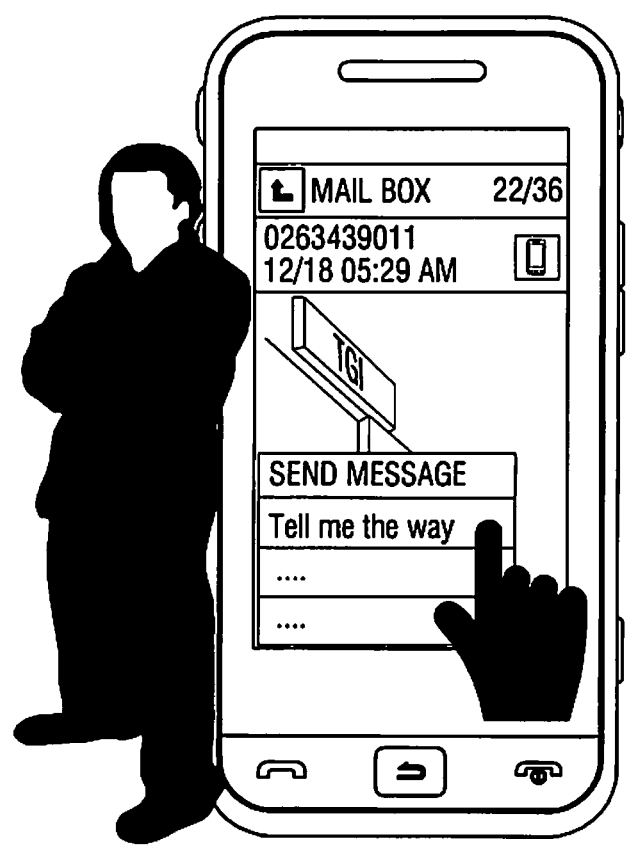
FIGS. 5A to 5D illustrate a route guiding method of the user terminal according to FIG. 3.

According to FIG. 5A, the user B receives target recognition information in the form of a text which is extracted from image data including photographed trade name of "TGI" and to which current position information of the user terminal 100 of the user A is tagged, from the user A (FIG. 4A, 4B) through the user terminal 200.

Figure 5B:
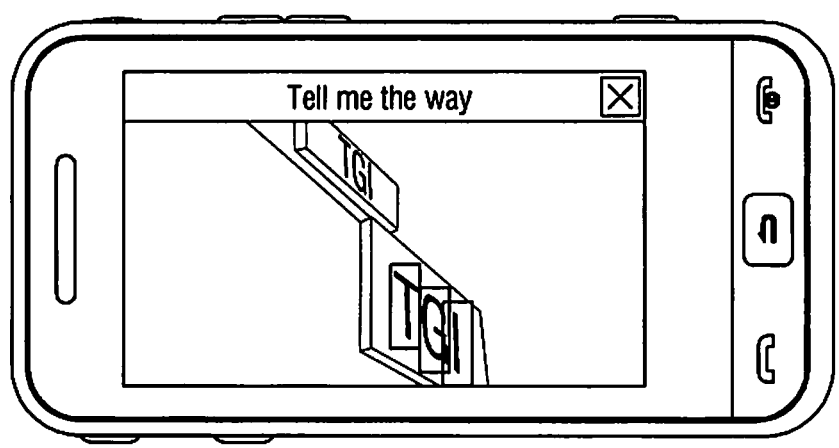

According to FIG. 5B, the user B may select a menu for guiding a route ("Tell me the way") to a target position ("TGI") regarding received image data.

If the user terminal 200 receives image data, a trade name ("TGI") may be extracted from the received image data.

Figure 5C:
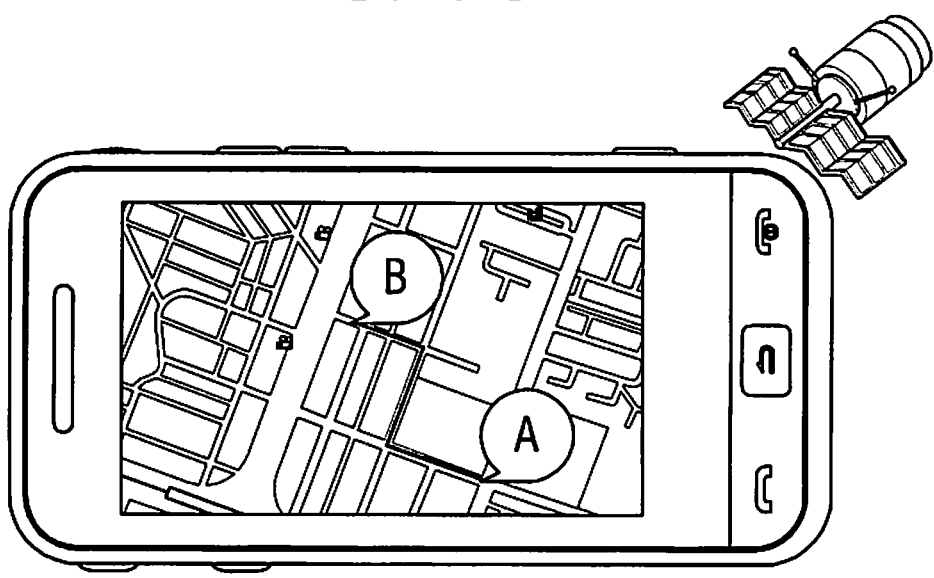

According to FIG. 5C, the user terminal 200 may search a target using target recognition information, for example, a trade name or position information tagged to image data. The target may be searched based on the first and the second reference information pre-stored in a storage unit in the user terminal 200 or an external data server, and position information regarding the searched target may be provided.

In addition, a current position (A) may be identified by reception of a GPS signal regarding the current position from the GPS satellite 10.

Subsequently, route guiding information may be output in the form of a navigation map in which the current position (A) and the searched target (B) are displayed.

Figure 5D:
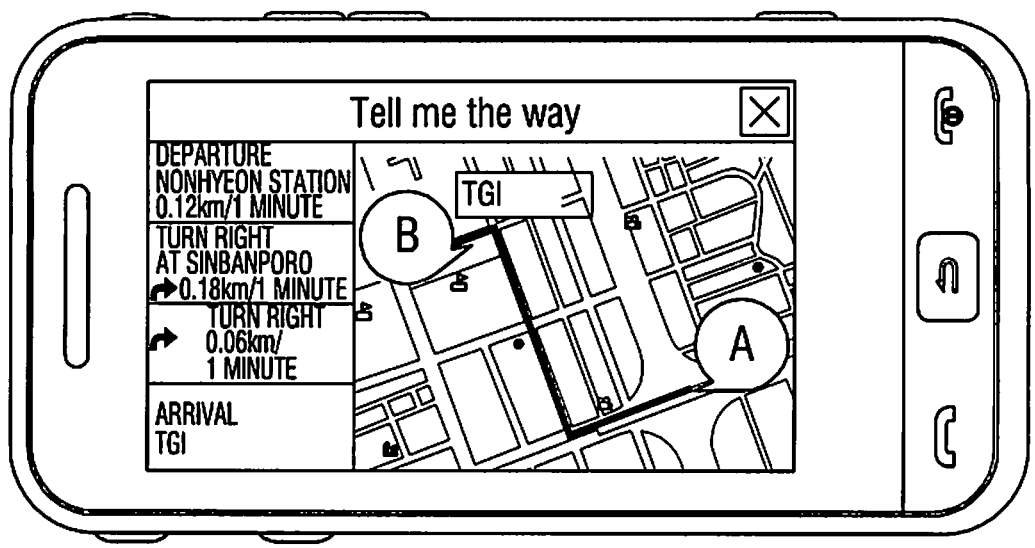

According to FIG. 5D, a time to reach the target (B), a landmark on the moving path, and so forth may be displayed on the navigation map. Accordingly, a user who receives image data to which position information is tagged through the terminal 200 may be provided with a moving path to a destination.

Figure 6A:
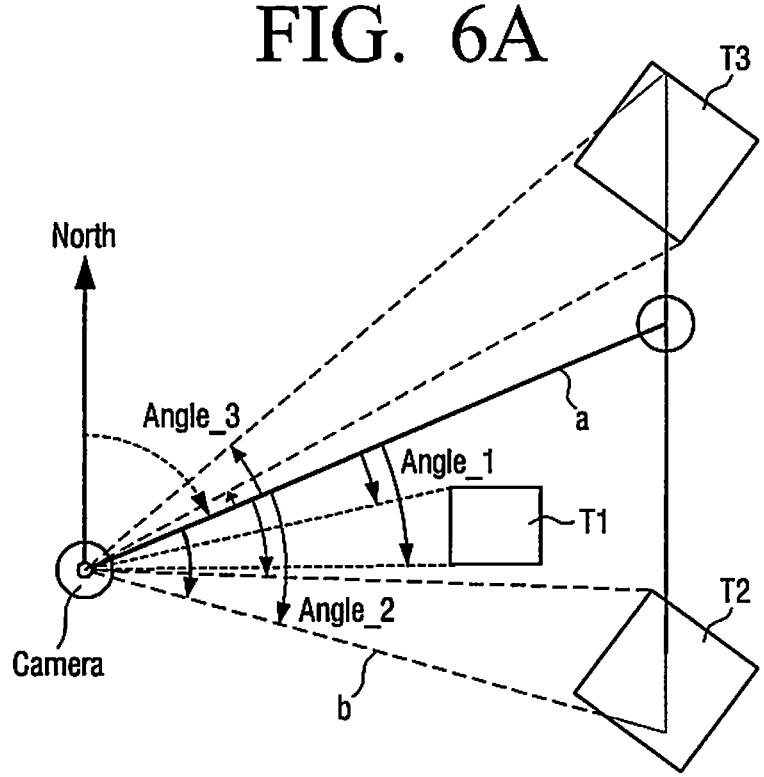
FIGS. 6A to 6B illustrate a method for using direction information according to an embodiment of the present invention.
Figure 6B:
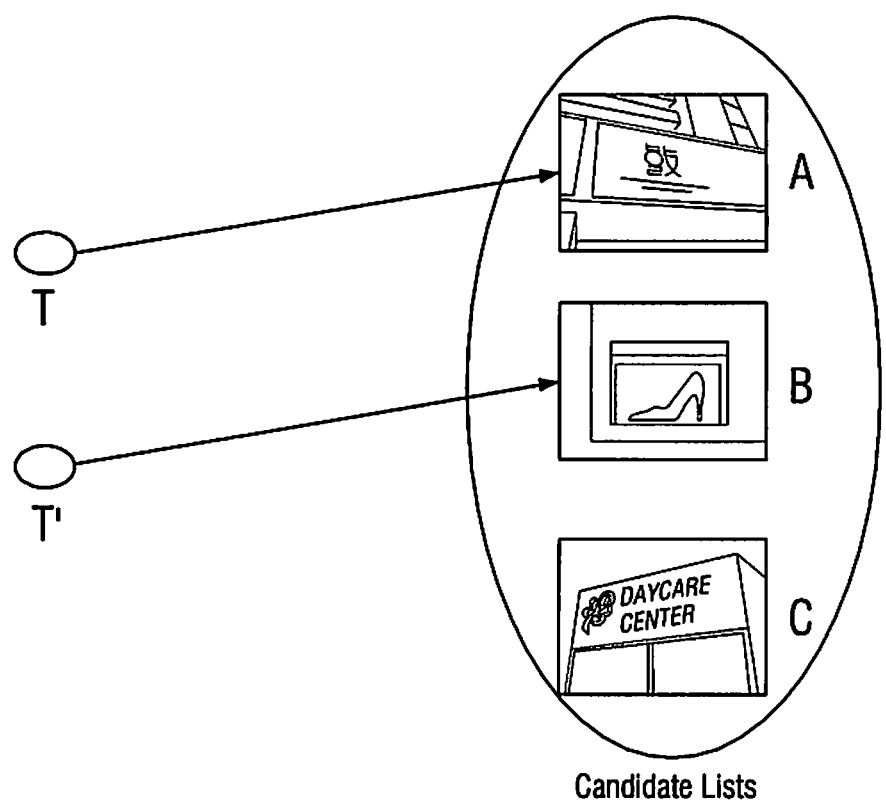

FIGS. 6A to 6B illustrate a method for using direction information according to another exemplary embodiment.

According to FIG. 6A, the user terminal 200 may detect direction information regarding a photographing direction at a time when a trade name of a target is photographed, from received image data. Herein, the direction information may be an azimuth angle.

For example, if received direction information is azimuth angle 'a', target candidates may be target 1 (T1), target 2 (T2), and target 3 (T3), which are within an error range regarding azimuth angle 'a' with respect to received position information (P').

Even if received position information (P') is different from a current position information (P), target candidates which are within an error range with respect to an azimuth angle may be included in a candidate list.

Such target candidates may be useful if a text included in target recognition information is unclear, or if there is error in position information generated by a GPS signal.

For example, since not only target 2 (T2) corresponding to direction information received with respect to received position information (P') but also target candidates (T1, T3) within an error range are included in a candidate list, a target may be accurately detected even when received position information (P') is different from a current position information (P).

In addition, since a target is searched based on a candidate list, the target may be accurately detected even if a text extracted from target recognition information is not clear.

Figure 7:
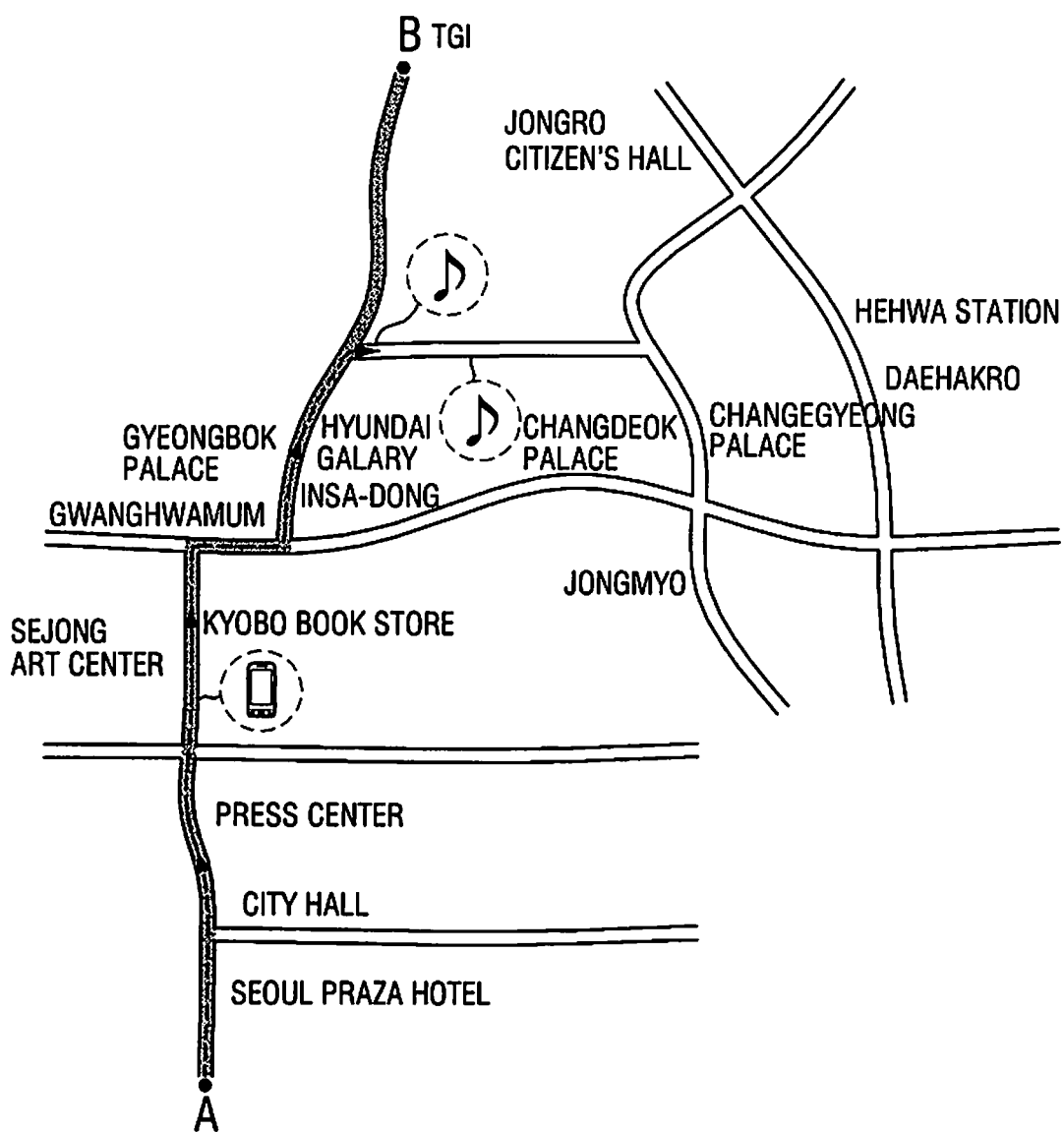
FIG. 7, FIG. 8A and FIG. 8B illustrate examples of route guiding according to the present invention.

FIG. 7 illustrates a route guiding method according to an embodiment of the present invention.

Referring to FIG. 7, route guiding information regarding a moving path from a current position (A) of the user terminal 200 to a target (B,TGI) is displayed on a navigation map displayed on the user terminal 200.

an actual moving path of the user terminal 200 is displayed on the route guiding information in a dotted line, such that a user may identify his or her moving path.

If the user terminal 200 digresses from a path which conforms to route guiding information, an alarm or a warning window (not shown) may be displayed on the screen.

Figure 8A:
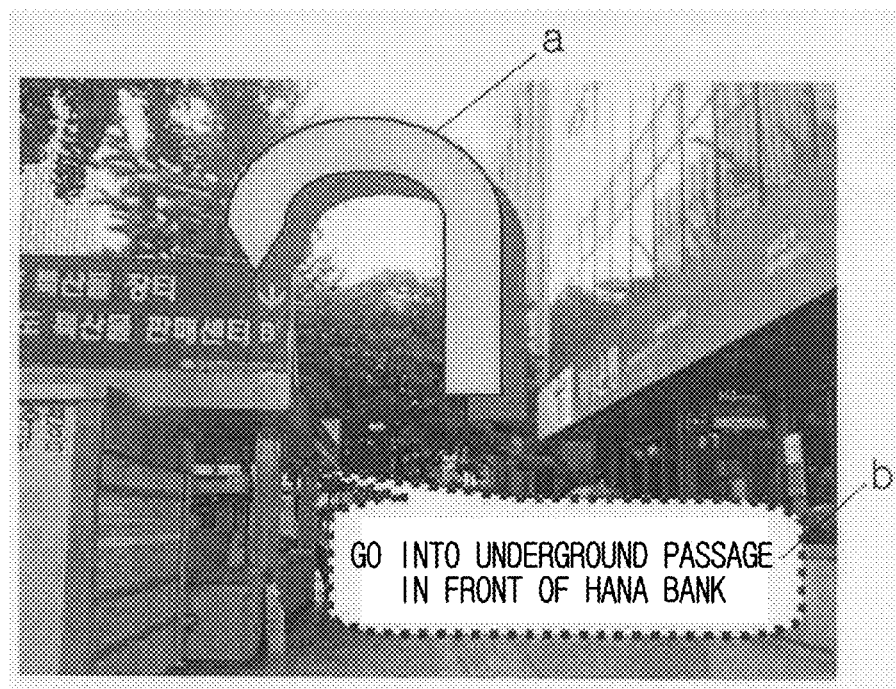
Figure 8B:
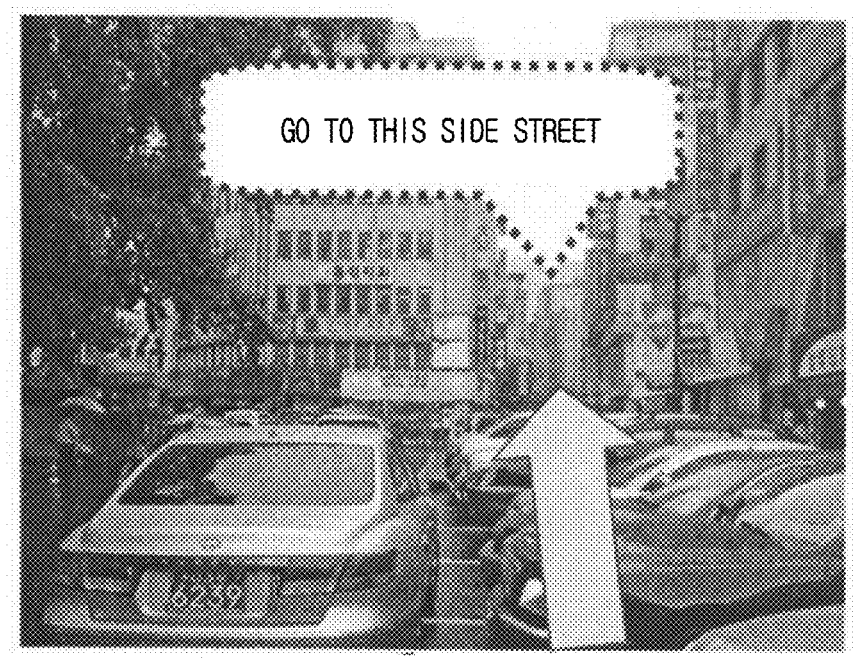

FIG. 8A and FIG. 8B illustrate another route guiding method according to an embodiment of the present invention.

As illustrated in FIGS. 8A and 8B, if a user arrives at an unrecognized place while moving according to route guiding information, the user terminal may provide photo information including a direction sign or route guiding announcement, to show the user a direction in which the user should travel.

According to FIG. 8A, the photo information is provided at a main point while a user moves from a departing place to a destination, and includes a direction sign (a) and route guiding announcement (b) to show the user a direction in which the user should travel.

According to FIG. 8B, the photo information which is provided at an unrecognized point while a user moves from a departing place to a destination includes a direction sign and route guiding announcement to show the user a direction in which the user should travel.

The photo information may be provided through the server 20, or a user may personally photograph a place for route guidance and receive additional information.

Figure 9:
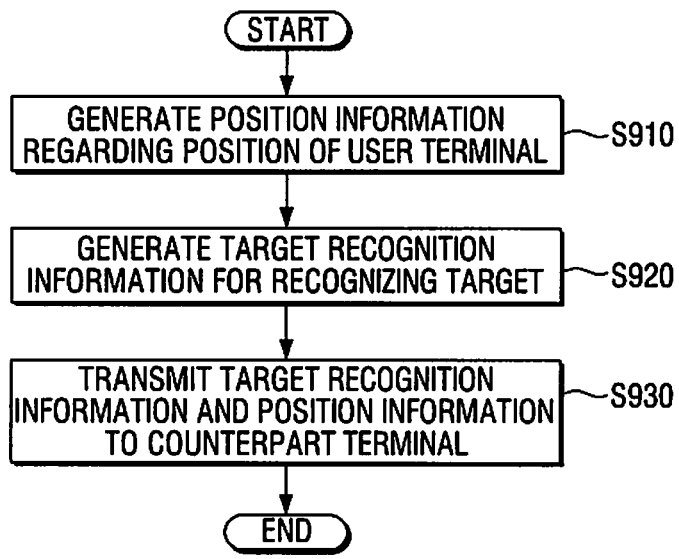
FIG. 9 illustrates a position providing method of a user terminal according to an embodiment of the present invention.

FIG. 9 illustrates a position providing method of a user terminal according to an embodiment of the present invention.

Referring to FIG. 9, position information regarding a position of a user terminal is generated in step S910), target recognition information for recognizing a target is generated (S920), and the generated target recognition information and position information are transmitted to a counterpart terminal (S930).

In FIG. 9, steps S910 and S920 may be performed simultaneously, or S920 may be performed prior to S910.

In step S930, target recognition information and position information may be transmitted to a counterpart terminal according to information input by a user or pre-stored information.

The target recognition information may be a text (for example, a trade name) either extracted from image data include the trade name or included in a text message input by a user.

Figure 10:
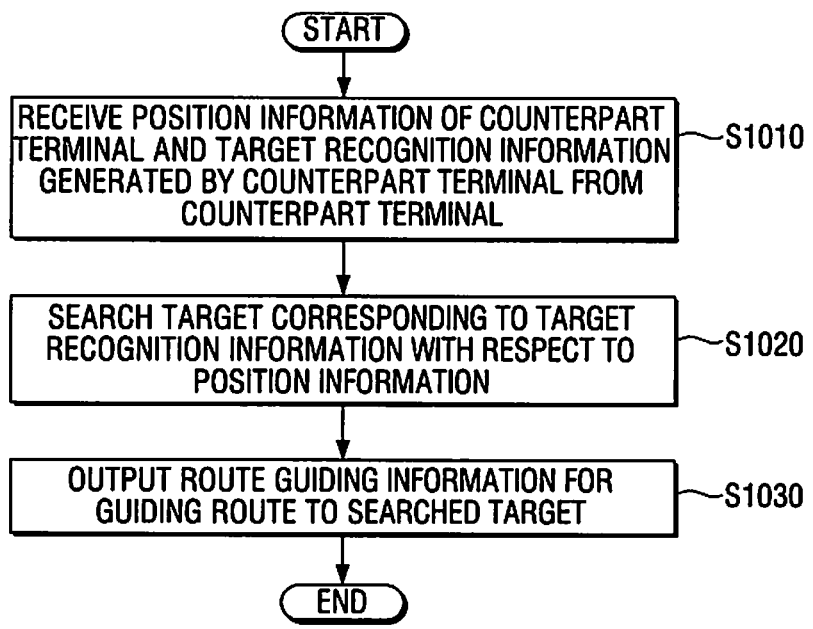
FIG. 10 illustrates a route guiding method of a user terminal according to an embodiment of the present invention.

FIG. 10 illustrates a route guiding method of a user terminal according to an embodiment of the present invention.

Referring to FIG. 10, position information of a counterpart terminal and target recognition information generated by the counterpart terminal is received from the counterpart terminal in step S1010, a target corresponding to the target recognition information with respect to the position information is searched in step S1020, and route guiding information to the searched target is output in step S1030.

In step S1020, a target may be searched by application of LBS technology to the position information and the target recognition information.

In addition, in step S1030, route guiding information may be output in the form of a navigation map.

Herein, the target recognition information may be a text (for example, a trade name) either included in a text message or extracted from image data including the trade name.

Target recognition information may be extracted from image data in the form of a text and used. If it is not possible to extract a text from image data, a target may be set based on position information.

Position information regarding a position of a user terminal may be generated and transmitted to a counterpart terminal according to a user's command.

A moving direction of a user terminal may be measured using an electronic compass, and displayed on a navigation map.

FIG. 11 illustrates a route guiding method of a route guiding system according to an embodiment of the present invention.

Referring to FIG. 11, the first user terminal 100 receives a GPS signal (S110), and generates position information for indicating a position of the first user terminal and target recognition information for recognizing a target in step S120.

The target recognition information generated in step S120 is transmitted to a second user terminal in step S10.

The second user terminal receives position information and target recognition information from the first user terminal in step S230.

A target corresponding to target recognition information with respect to position information is searched in step S240.

Route guiding information to the searched target is output in step S250.

The second user terminal 200 may transmit its position information to the first user terminal 100 in step S20.

Herein, the target recognition information is embodied as described above.

In this case, route guiding information may be output in the form of a navigation map in step S250.

Accordingly, a user may easily identify a moving path to a destination.

Although embodiments of the present invention have been shown and described, it will be appreciated by those skilled in the art that changes may be made to these embodiments without departing from the principles and spirit of the invention, the scope of which is defined in the claims and their equivalents.

What is claimed is:

1. A user terminal, comprising:
a display;
a communication unit configured to receive an image of an object photographed by an external device, position information of the external device and direction information that includes a direction from which the external device photographs the object; and
a controller configured to obtain a position of a destination based on the object extracted from the image and the position information, search for at least one path from a position of the user terminal to the position of the destination, and control the display to provide the searched at least one path,
wherein, if the position information does not correctly present the position of the destination, the controller is further configured to search a plurality of candidate destinations existing within a predetermined direction range based on the position information using the direction information, and control the display to provide a candidate list including the plurality of candidate destinations selected from the candidate list, and
wherein the image of the object is captured by the external device located at the position of the destination.

2. The user terminal as claimed in claim 1, wherein the position of the user terminal is recognized by a location sensor.

3. The user terminal as claimed in claim 1, wherein the position information of the external device includes at least one of a trade name, a building name, an address, and a telephone number.

4. The user terminal as claimed in claim 1, wherein the position of the user terminal includes at least one of a trade name, a building name, an address, and a telephone number.

5. The user terminal as claimed in claim 1, wherein the controller is configured to control to display the searched at least one path as a navigation map.

6. The user terminal as claimed in claim 1, wherein the communication unit is further configured to receive text data including the position information of the external device.

7. A method of a user terminal, the method comprising:
receiving an image of an object photographed by an external device, position information of the external device and direction information that includes a direction from which the external device photographs the object;
obtaining a position of a destination based on the object extracted from the image and the position information;
searching for at least one path from a position of the user terminal to the position of the destination; and
displaying the searched at least one path,
wherein obtaining the position of the destination comprises, if the position information does not correctly present the position of the destination, searching a candidate list including a plurality of candidate destinations existing within a predetermined direction range based on the position information using the direction information, controlling the display to provide a candidate list including the plurality of candidate destinations selected from the candidate list, and obtaining the position of the destination, and wherein the image of the object is captured by the external device located at the position of the destination.

8. The method as claimed in claim 7, further comprising recognizing the position of the user terminal by a location sensor.

9. The method as claimed in claim 7, wherein the position information of the external device includes at least one of a trade name, a building name, an address, and a telephone number.

10. The method as claimed in claim 7, wherein the position of the user terminal includes at least one of a trade name, a building name, an address, and a telephone number.

11. The method as claimed in claim 7, wherein the searched at least one path is displayed as a navigation map.

12. The method as claimed in claim 7, further comprising receiving text data including the position information of the external device.

\* \* \* \* \*